J. J. CHARLEY.
RESILIENT VEHICLE WHEEL AND TIRE.
APPLICATION FILED OCT. 11, 1919.
1,402,717.
Patented Jan. 3, 1922.
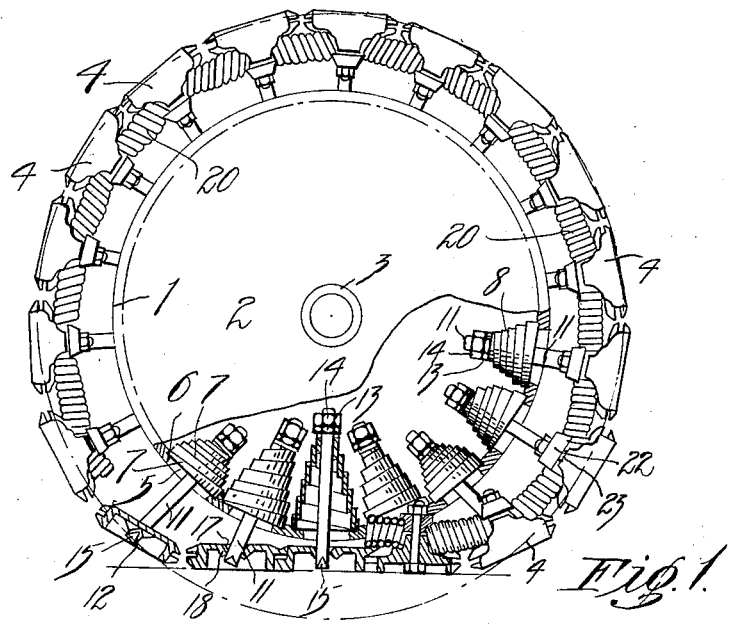
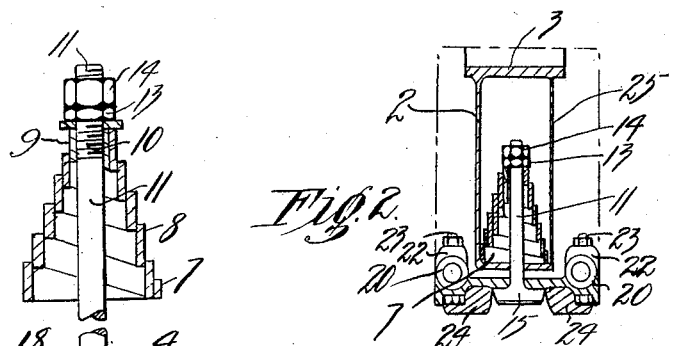
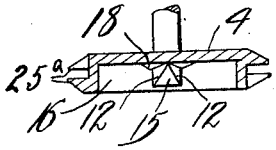
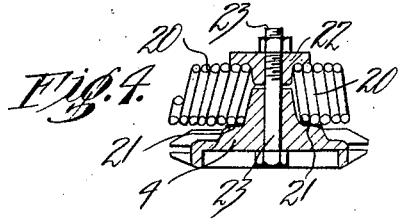
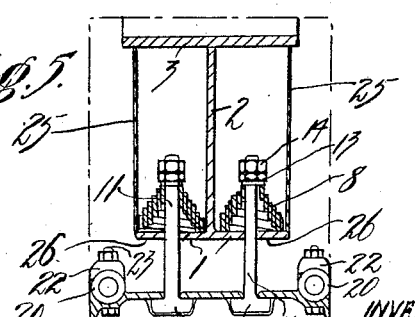
INVENTOR:
John Joseph Charley
By Lawrence Langner
ATTORNEY.

UNITED STATES PATENT OFFICE.

JOHN JOSEPH CHARLEY, OF MURRUMBEENA, VICTORIA, AUSTRALIA.

RESILIENT VEHICLE WHEEL AND TIRE.

1,402,717. Specification of Letters Patent. Patented Jan. 3, 1922.

Application filed October 11, 1919. Serial No. 330,042.

*To all whom it may concern:*

Be it known that I, JOHN JOSEPH CHARLEY, a subject of the King of Great Britain, and resident of Dandenong Road, Murrumbeena, in the State of Victoria, Commonwealth of Australia, have invented certain new and useful Improvements in Resilient Vehicle Wheels and Tires, of which the following is a specification.

This invention relates to improvements in vehicle wheels and tires and is specially applicable to the wheels of vehicles designed for heavy haulage such as tractors, agricultural implements and commercial vehicles although by modifications the devices may be adapted for use with vehicles of reasonably high speed capacity.

This invention has been devised in order to provide in a wheel a flexible or resilient tire that will yield to pressure such as that occasioned by the weight carried by an axle resulting in an increased area of tire in contact with road or ground surface.

The invention consists essentially in the combination in a vehicle wheel of a plurality of feet or shoes to form a tire, said shoes being arranged to rock upon supports carried by the ends of bolts extending radially inwards through an inner rim and each surrounded by a coil spring exerting an inward pull on the bolts and shoes, and springs in compression arranged between each shoe and the adjacent shoes on either side thereof, adapted to return the shoes to normal position after each deflection caused by the weight of the vehicle or road shocks.

In order that the invention may be more readily understood it will now be described with reference to the accompanying drawings in which:—

Figure 1 is a view in side elevation partly in section of the improved resilient wheel, the sectional portions illustrating several distinct sections of essential features embodied in the invention.

Figure 2 is a view in vertical central section of half of the wheel illustrated in Figure 1.

Figure 3 is an enlarged view in section of a shoe, its fulcrum support and the connection at the inner end of the support with a volute spring.

Figure 4 is an enlarged view illustrating the means for connecting the peripheral coiled springs to the shoes.

Figure 5 is a view in vertical central section of a modification.

According to this invention the wheel is provided with an inner and outer rim.

The inner rim 1 is formed integral with a flange disc 2 extending from the wheel hub or centre 3. The said rim 1 may extend from one side of the flange or disc 2 as illustrated in Figure 2 or from both sides as illustrated in Figure 5.

The outer rim or tread is made up of a plurality of metal shoes or sections 4 equally spaced around but some distance away from the inner rim 1 thus forming a tread around the inner rim 1 and a suitable space between the inner rim member 1 and the tread shoes 4.

The inner rim 1 has holes 5 equally spaced around its circumference, each hole 5 being elongated, its length running with the circumference of the rim 1. Surrounding these holes 5 are circular seats or recess 6, the diameter of the circular recess being slightly in excess of the length of the hole and each recess 6 around each hole 5 receives the base 7 of a volute spring 8.

The inner end of each volute spring 8 surrounds a flanged sleeve 9 through which the threaded end 10 of a bolt 11 passes, the bolt at this point being threaded and receiving the adjusting and lock nuts 13, 14. By adjusting the nuts 13, 14 on the bolt 11, the springs 8 are adjusted.

A bolt 11 passes loosely through each hole 5 in the rim and at its outer end is formed with a T head 15, tapered as at 12 to form a knife edge bearing for the shoe 4.

Each shoe or section 4 of the tread is hollow as at 16 on its outer side, is centrally perforated at 17, and is formed with a bearing surface 18 for the knife edge bearing 12 of the cross piece or head 15 of its supporting bolt, the shank of which passes through the hole 17 in the shoe as illustrated.

There is thus one bolt 11, one volute spring 8, one sleeve 9, and one adjusting and lock nut for each shoe 4 forming the tire.

Between each shoe 4 and the adjacent shoe on either side thereof, is arranged a pair of flexible members, consisting preferably of close wound spiral springs 20. Each pair of springs is arranged between the opposite ends of adjacent shoes as illustrated in Figures 2 and 5.

These spiral springs 20 are preferably connected to the shoes 4 by forming half the circumference of an internal thread in the inner end of the shoe 4 as at 21 and the other half in a cap 22, the springs 20 being placed in position and after placing the cap 22 thereon, a bolt 23 with a nut tightens the shoe 4 and cap 22 together and holds the springs firmly in the threaded recesses.

A suitable rubber or other tread portion or portions 24 may be fitted in the hollow portions of the shoes 4 on either side of the bolt heads 15 if so desired, and a cover plate 25 is arranged to extend from the hub to the rim on the uncovered side of the wheel. Suitable lugs 25$^a$ are formed at the ends of the shoes 4, and these lugs are adapted to have an interlocking engagement, as indicated in Fig. 1, permitting a gradual pressure to be exerted on the springs 20.

In the modification illustrated in Figure 5 a substantially broad wheel suitable as a motor lorry wheel is shown the rim 1 being extended on either side of the flange or disc 2 extending from the wheel centre or hub 3 and each flange 26 of the rim 1 on either side of the centre accommodates volute springs 8, bolts 11, sleeves 9 and nuts 13, 14. The heads 15 of the bolts 11 engage shoes 4 which rock on the knife edges 12 of the bolt heads and also connect the springs 20 in the manner above described.

In the operation of the wheel the bolts 11 have a range of oscillation in the shoes 4 to the extent of the holes in the latter, the knife edge bearing forms the shoe pivot and the bolt 11 has a further range of movement in its respective hole in the inner rim 1, the volute spring 8 being a flexible member allowing of such movement.

The pull on the bolts 11 exerted by the volute springs 8 cause a circumferential pressure on the tire and therefore on the spiral springs 20, spacing and connecting the shoes 4. The pressure being in the form of one coil against the other makes these springs 20 more resistant to flexing and therefore more weight supporting and the greater the weight carried by the wheel within limits, the greater the circumferential pressure on the tire of which the spiral springs 20 form a part.

The flattening of the tire when in contact with the road has the effect of altering the angle of the before described bolts 11 preceding and succeeding the flat tread portion at road contact so that they point in a direction considerably below the center of the wheel and the angle of the oncoming shoe 4 is conformed to meet the road due to the above and the outward flexing of the tire preceding the road contact which is made practicable by the slotted holes in the inner rim 1 and shoes 4 giving the necessary freedom to the supporting bolts 11.

The volute springs 8 exert an inward pull on the tire.

I desire it to be understood that various modifications and improvements within the scope of the claims may be embodied in the invention for carrying the herein described functions into practical effect.

What I claim as my invention and desire to secure by Letters Patent is—

1. In a resilient vehicle wheel, the combination with a frame; of a plurality of shoes mounted circumferentially of said frame; supports on which said shoes are adapted to rock; expansion springs connecting said supports with said frame and adapted to permit an inward and outward movement of said supports relative to said frame; and a plurality of compression springs arranged between and connecting adjacent shoes.

2. In a resilient vehicle wheel, the combination with a frame; of a plurality of shoes mounted circumferentially of said frame; supports on which said shoes are adapted to rock, said supports being loosely mounted in said frame to permit the shoes to assume various positions with respect to the frame at the point of road contact; springs for connecting said supports to the frame; and compression springs between and connecting adjacent shoes.

3. In a resilient vehicle wheel, the combination of a frame; a plurality of shoes mounted circumferentially of said frame; rods having at one end knife-blade-bearings for the shoes to permit a rocking movement thereof on the rods and at the other end passing through peripheral and circumferentially elongated slots in said frame, said slots permitting arcuate and radial movements of said rods in said frame; and a volute spring connected at one end to the end of each of said rods which passes through said frame and the other end of each of said springs being mounted in a recess formed in said frame surrounding said slot through which its associated rod passes.

4. In a resilient vehicle wheel, the combination of a frame; rods radially mounted in said frame; shoes mounted on said rods for rocking movement thereon; springs supporting said shoes and rods in said frame; springs under compression positioned circumferentially between adjacent shoes; and bolts mounted in the shoes and having caps provided with threads into which the last mentioned springs are mounted and secured.

5. In a resilient vehicle wheel, the combination of a frame; peripheral tread shoes; supporting rods for said shoes; knife-blade-bearings between the supporting rods and the shoes; and springs connected with said frame at their outer ends and secured to said supporting rods at their inner ends.

6. In a resilient vehicle wheel, the combination of a frame; a plurality of rocking shoes disposed circumferentially of said frame; springs connecting said shoes and said frame adapted to support the load carried by the wheel and absorb shocks; and springs circumferentially arranged between adjacent shoes.

7. In a resilient vehicle wheel, the combination of a wheel center and rim; a plurality of tire shoes mounted circumferentially of said rim; supporting rods on which said shoes are rockable and which pass through slots in the rim; volute springs connected to the inner ends of said rods and engaging said rim; and spiral springs arranged circumferentially between the shoes, the arrangement being such that the pull on the rods by the volute springs causes a circumferential pressure on the spiral circumferential springs, the springs being arranged in such manner that a maximum load may be supported.

Signed at Melbourne, in the State of Victoria, Commonwealth of Australia, this 4th day of August, 1919.

JOHN JOSEPH CHARLEY.

Witnesses:
SIDNEY HENDLEY,
A. EDWARDS.